United States Patent
Uno (10) Patent No.: US 9,651,780 B2
(45) Date of Patent: May 16, 2017

(54) VEHICULAR INFORMATION DISPLAY DEVICE

(75) Inventor: Hidenori Uno, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 83 days.

(21) Appl. No.: 14/403,434

(22) PCT Filed: Jun. 25, 2012

(86) PCT No.: PCT/JP2012/066172
§ 371 (c)(1),
(2), (4) Date: Nov. 24, 2014

(87) PCT Pub. No.: WO2014/002168
PCT Pub. Date: Jan. 3, 2014

(65) Prior Publication Data
US 2015/0160458 A1    Jun. 11, 2015

(51) Int. Cl.
*G02B 27/01* (2006.01)
*B60K 35/00* (2006.01)

(52) U.S. Cl.
CPC .......... *G02B 27/0101* (2013.01); *B60K 35/00* (2013.01); *B60K 2350/2052* (2013.01);
(Continued)

(58) Field of Classification Search
CPC ............ B60K 2350/2052; B60K 35/00; G02B 2027/0127; G02B 2027/013;
(Continued)

(56) References Cited

U.S. PATENT DOCUMENTS

| | | |
|---|---|---|
| 2005/0140929 A1 | 6/2005 | Nambudiri et al. |
| 2009/0067058 A1* | 3/2009 | Ishii ........................ G02B 27/01 359/630 |

(Continued)

FOREIGN PATENT DOCUMENTS

| | | |
|---|---|---|
| JP | 05-124455 A | 5/1993 |
| JP | 2004-126450 A | 4/2004 |

(Continued)

OTHER PUBLICATIONS

Machine translated JP2012-058688 (Matsushita_JP_2012-058688_EngXlate.pdf).*

*Primary Examiner* — Sing-Wai Wu
(74) *Attorney, Agent, or Firm* — Sughrue Mion, PLLC (57) ABSTRACT

A vehicular information display device is equipped with a first reflection portion that is formed by a front windshield itself or a combiner that is provided on the front windshield, a second reflection portion that is formed by a second combiner that is provided apart from the front windshield, and a floodlight that projects display light onto the first reflection portion and the second reflection portion. The vehicular information display device is characterized in that the first reflection portion and the second reflection portion generate a three-dimensional indication with a virtual image according to the first reflection portion and a virtual image according to the second reflection portion superimposed on each other, or an integral indication with a virtual image according to the first reflection portion and a virtual image according to the second reflection portion integrated with each other.

4 Claims, 5 Drawing Sheets (52) U.S. Cl.
CPC .. *G02B 2027/013* (2013.01); *G02B 2027/014* (2013.01); *G02B 2027/0127* (2013.01); *G02B 2027/0141* (2013.01); *G02B 2027/0196* (2013.01)

(58) Field of Classification Search
CPC ...... G02B 2027/014; G02B 2027/0141; G02B 2027/0196; G02B 27/0101
See application file for complete search history.

(56) References Cited

U.S. PATENT DOCUMENTS

| | | |
|---|---|---|
| 2011/0175798 A1 | 7/2011 | Sato et al. |
| 2013/0188260 A1 | 7/2013 | Matsushita et al. |

FOREIGN PATENT DOCUMENTS

| | | |
|---|---|---|
| JP | 2004-168230 A | 6/2004 |
| JP | 2009-184406 A | 8/2009 |
| WO | 2012/036099 A1 | 3/2012 |

\* cited by examiner

VEHICULAR INFORMATION DISPLAY DEVICE

TECHNICAL FIELD

The invention relates to a vehicular information display device that is equipped with a combiner and a floodlight.

BACKGROUND ART

Conventionally, this kind of vehicular information display device is known as a head-up display (an HUD). As for this HUD, there is known an art attempting to display a plurality of virtual images whose distances from the position of an eye of a driver are different from one another, through the use of a combiner provided on the surface of a front windshield and a plurality of floodlights (display boards) (e.g., see Patent Document 1).

RELATED ART DOCUMENT

Patent Document

Patent Document 1: Japanese Patent Application Publication No. 2004-168230 (JP-2004-168230 A)

SUMMARY OF THE INVENTION

Problem to Be Solved by the Invention

However, with the conventional HUD as disclosed in Patent Document 1, only the combiner that is provided along the surface of the front windshield is employed. Therefore, if an attempt is made to realize the multiplicity of an indication (e.g., a three-dimensional indication) or the enlargement of a display range, the configuration on the floodlight side needs to be devised. In this case, the configuration on the floodlight side is very extensive, so there is a problem of a deterioration in the mountability of the HUD into a limited space in an instrument panel.

It is thus an object of the invention to provide a vehicular information display device that has good mountability while making it possible to realize the multiplicity of an indication and the like.

Means for Solving the Problem

According to one aspect of the invention, there is provided a vehicular information display device that is equipped with a first reflection portion that is formed by a front windshield itself or a combiner that is provided on the front windshield, a second reflection portion that is formed by a second combiner that is provided apart from the front windshield, and a floodlight that projects display light onto the first reflection portion and the second reflection portion. The vehicular information display device is characterized in that the first reflection portion and the second reflection portion generate a three-dimensional indication with a virtual image according to the first reflection portion and a virtual image according to the second reflection portion superimposed on each other, or an integral indication with a virtual image according to the first reflection portion and a virtual image according to the second reflection portion integrated with each other.

Effect of the Invention

According to the invention, there is obtained a vehicular information display device that has good mountability while making it possible to realize the multiplicity of an indication and the like.

MODES FOR CARRYING OUT THE INVENTION

The best modes for carrying out the invention will be described hereinafter with reference to the drawings.

Figure 1:
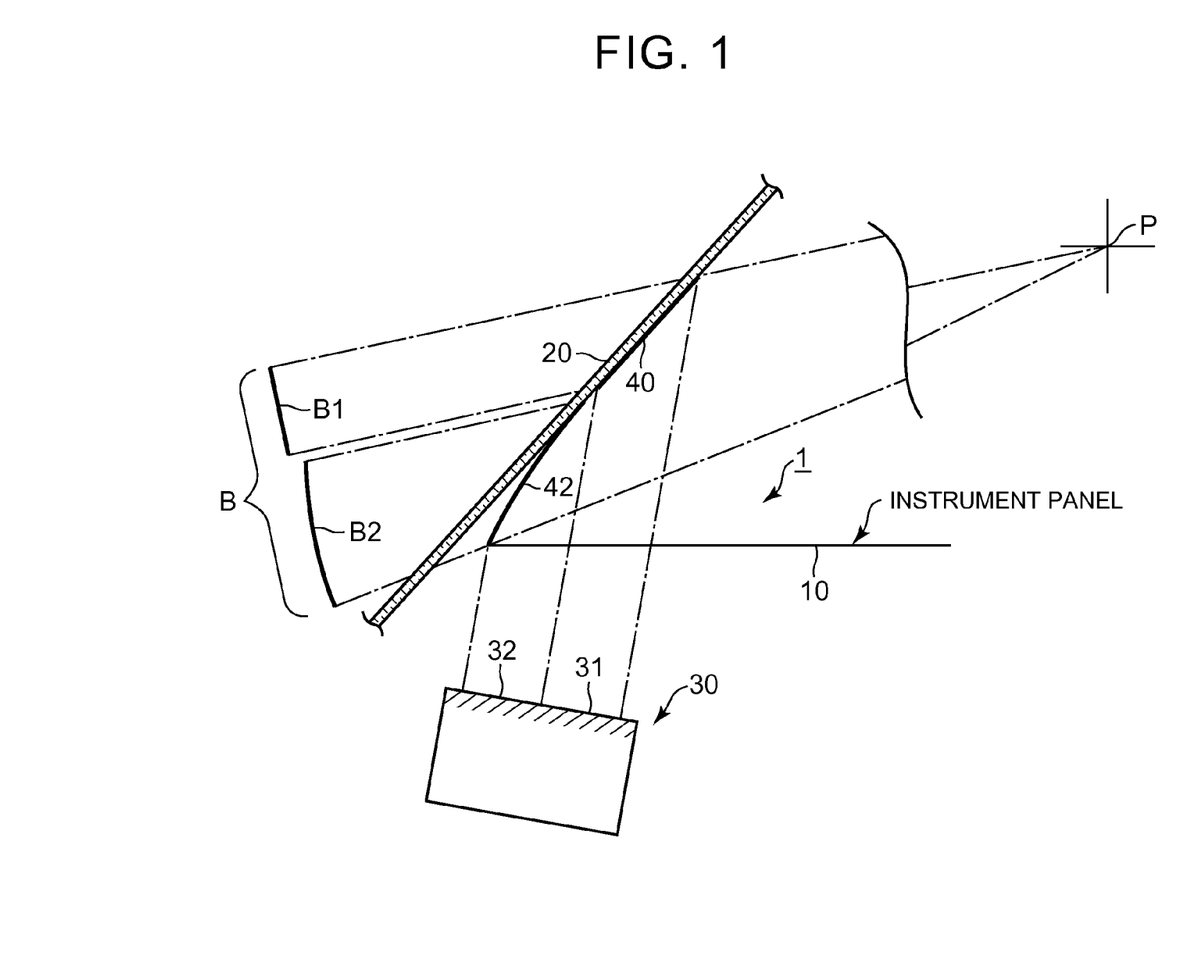
FIG. 1 is a view showing the configuration of a vehicular information display device 1 according to one embodiment of the invention (the first embodiment of the invention).

FIG. 1 is a view showing the configuration of the vehicular information display device 1 according to one embodiment of the invention (the first embodiment of the invention). FIG. 1 is a view from beside a vehicle, and shows an instrument panel 10 and a front windshield 20 in a cross-section. Besides, FIG. 1 schematically shows a floodlight 30 that is arranged inside the instrument panel 10.

The vehicular information display device 1 is equipped with a first combiner 40, a second combiner 42, and the floodlight (a display) 30.

The first combiner 40 is provided on the front windshield 20. The first combiner 40 is provided along a surface of the front windshield 20. In consequence, typically, the curvature of the first combiner 40 corresponds to the curvature of the front windshield 20. The first combiner 40 may be any type of combiner. For example, the first combiner 40 may be formed by a half mirror, or may be a holographic combiner employing a hologram. In the case of the holographic combiner, the hologram may be encapsulated between layers of the front windshield 20. Besides, the first combiner 40 may be configured as a reflection coating that is vapor-deposited on a matching surface side of a sheet of multi-layered glass or the like that constitutes the front windshield 20 (it should be noted, however, that this reflection coating has a permeability equal to or larger than a certain value).

The second combiner 42 is provided apart from the front windshield 20 (a surface thereof on a vehicle interior side). As shown in FIG. 1, the second combiner 42 is arranged on the vehicle interior side with respect to the surface of the front windshield 20. As is the case with the first combiner 40, the second combiner 42 may be any type of combiner. For example, the second combiner 42 is a holographic combiner employing a hologram. The second combiner 42 may be provided in such a manner that a lower end thereof is supported by the instrument panel 10.

The floodlight 30 generates visible rays of light (display light) for transmitting information to a driver. Any kind of information (image information) may be transmitted to the driver with the aid of the display light from the floodlight 30. For example, the floodlight 30 may project display light containing information included in an image signal received from an infrared camera (not shown) that photographs a landscape in front of the vehicle (i.e., front environment information). Besides, the floodlight 30 may project display light for transmitting navigation information from a navigation device. Besides, the floodlight 30 may project display light for transmitting meter information (e.g., a vehicle speed and the like) from a meter ECU. Besides, the floodlight 30 may project display light for transmitting states of an air-conditioner, audio equipment and the like.

The display light projected from the floodlight 30 reaches the first combiner 40 and the second combiner 42. The display light is diffracted toward an observer P (mainly the driver) by the first combiner 40 and the second combiner 42, and an indication (a virtual image) is generated in front of the observer P. Incidentally, in FIG. 1, a projection range (a light path) of the display light with respect to the observer P (more precisely, a position P of an eye of the observer) is indicated by an alternate long and short dash line. The indication generated by the first combiner 40 and the second combiner 42 may be of any type including a picture, characters, graphics or the like.

The floodlight 30 includes a first floodlight portion 31 that generates a part of the display light reaching the first combiner 40, and a second floodlight portion 32 that generates a part of the display light reaching the second combiner 42. Incidentally, the first floodlight portion 31 and the second floodlight portion 32 may be integrated with each other to form a single floodlight portion (a projection surface). That is, the first floodlight portion 31 and the second floodlight portion 32 may be realized by the single floodlight 30.

In the present embodiment of the invention, as described above, the two combiners, namely, the first combiner 40 and the second combiner 42 are employed to generate an indication. However, the first combiner 40 and the second combiner 42 are arranged such that a virtual image B1 according to the first combiner 40 and a virtual image B2 according to the second combiner 42 cooperate with each other to generate an integral indication B (see FIG. 1).

It should be noted herein that the integral indication B means that the virtual image B1 according to the first combiner 40 and the virtual image B2 according to the second combiner 42 have continuity. For example, in the case where the virtual image B1 according to the first combiner 40 provides a part of a road indication as navigation information, the virtual image B2 according to the second combiner 42 may provide a road indication that continues to the road indication according to the virtual image B1 (i.e., a continuous indication with these roads connected to each other). Besides, in the case where the integral indication B is an indication of a vehicle speed, the virtual image B1 according to the first combiner 40 may form an upper region of the number representing the vehicle speed, and the virtual image B2 according to the second combiner 42 may form a lower region of the number representing the vehicle speed.

Figure 2:
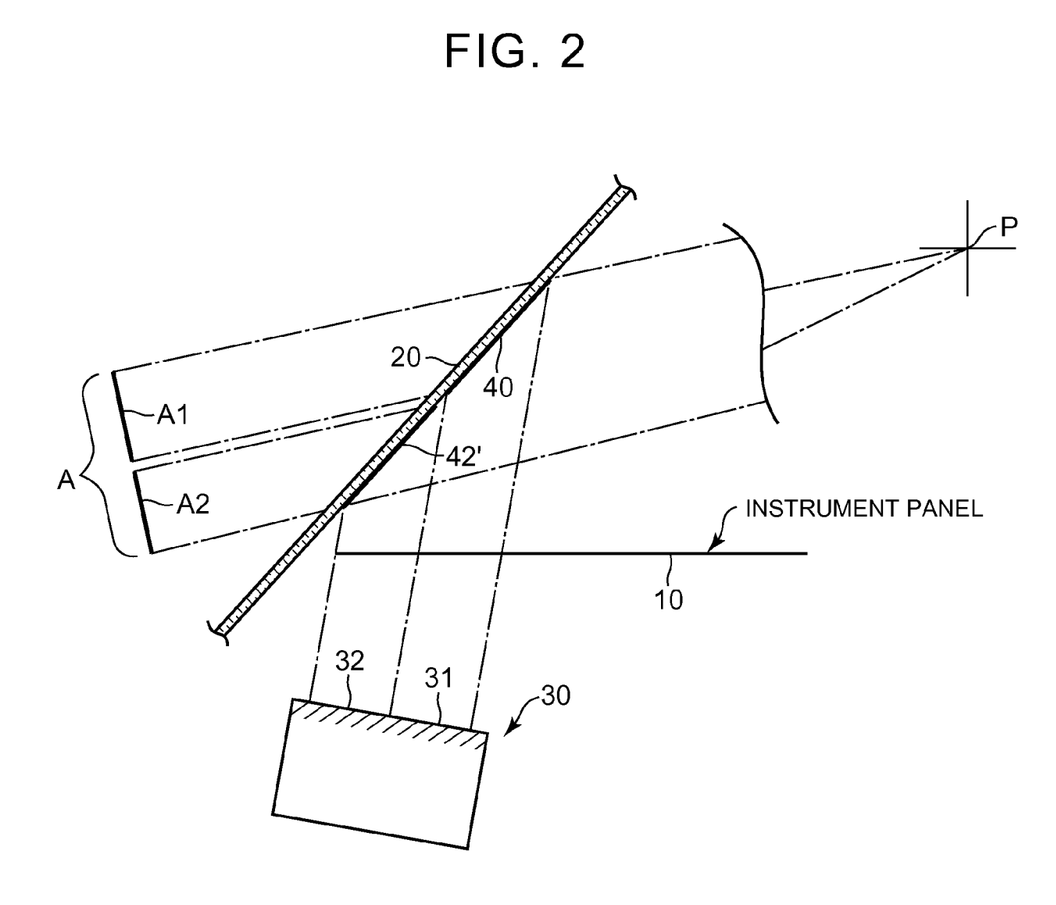
FIG. 2 is a view showing the configuration of a vehicular information display device according to a comparative example.

FIG. 2 is a view showing the configuration of a vehicular information display device according to a comparative example. This comparative example is different from the present embodiment of the invention shown in FIG. 2 and described above in that a second combiner 42' is provided along the front windshield 20. In this comparative example, the first combiner 40 and the second combiner 42' are arranged such that a virtual image A1 according to the first combiner 40 and a virtual image A2 according to the second combiner 42' cooperate with each other to generate an integral indication A (see FIG. 2).

By the way, in the present embodiment of the invention shown in FIG. 1 and described above, while the first combiner 40 is provided along the surface of the front windshield 20, the second combiner 42 is provided apart from the surface of the front windshield 20, as described above. It should be noted herein that the curvature of the second combiner 42' coincides with the curvature of the front windshield 20 in the comparative example (see FIG. 2) in which the second combiner 42' is provided along the front windshield 20.

On the other hand, in the case where the second combiner 42 is provided apart from the surface of the front windshield 20 as in the present embodiment of the invention, the curvature of the second combiner 42 can be freely determined regardless of the curvature of the front windshield 20.

Accordingly, the present embodiment of the invention makes it possible to make the display range larger than in the comparative example by appropriately setting the curvature of the second combiner 42. In the example shown in FIG. 2, the second combiner 42 has a center of curvature on the vehicle interior side (i.e., is convex on a vehicle exterior side), and the curvature of the second combiner 42 is set larger than the curvature of the front windshield 20 (i.e., is set such that the degree of curvature becomes higher than that of the front windshield 20). Thus, as can be understood from a comparison between FIG. 1 and FIG. 2, the present embodiment of the invention can make the display range larger than the comparative example for the same projection area of the floodlight 30. Specifically, in the present embodiment of the invention, the first combiner 40 and the second combiner 42 generate the integral indication B (see FIG. 1) with the virtual image B1 according to the first combiner 40 and the virtual image B2 according to the second combiner 42 integrated with each other. In the comparative example, the first combiner 40 and the second combiner 42' generate the integral indication A (see FIG. 2) with the virtual image A1 according to the first combiner 40 and the virtual image A2 according to the second combiner 42' integrated with each other. However, the display range of the indication B is larger than the display range of the indication A. Incidentally, the virtual image B1 according to the first combiner 40 and the virtual image A1 according to the first combiner 40 are identical to each other, and their display ranges are also identical to each other.

Besides, according to the present embodiment of the invention, the continuity of the virtual image B1 according to the first combiner 40 and the virtual image B2 according to the second combiner 42 can be enhanced by appropriately setting the curvature and angle of inclination of the second combiner 42. That is, an upper end of the virtual image B2 according to the second combiner 42 can be made close to a lower end of the virtual image B1 according to the first combiner 40, and the continuity of the virtual images B1 and B2 can be enhanced (a seamless indication can be realized) by appropriately setting the curvature and the like of the second combiner 42. Incidentally, in the example shown in FIG. 2, the second combiner 42 is configured (arranged) in such a manner that an upper end side thereof is closer to the front windshield 20 than a lower end side thereof. Besides, the second combiner 42 is set such that the angle of inclination thereof with respect to the instrument panel 10 becomes larger than the angle of inclination thereof with respect to the front windshield 20 (in a rising direction). Incidentally, in the example shown in FIG. 2, the upper end side of the second combiner 42 may be in contact with the front windshield 20 (incidentally, in this case as well, the second combiner 42 is provided, except on the upper end side thereof, apart from the front windshield 20).

Figure 3:
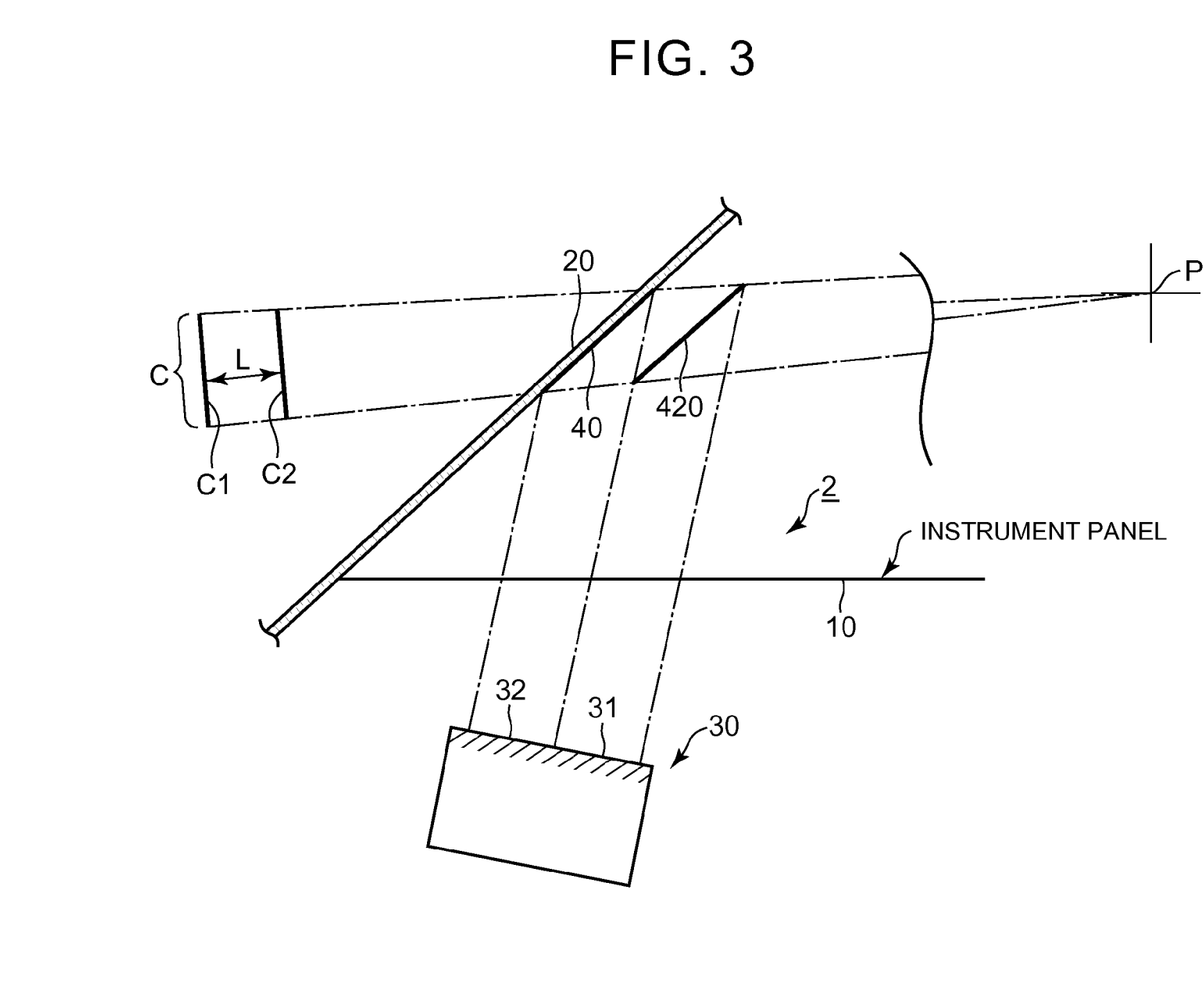
FIG. 3 is a view showing the configuration of a vehicular information display device 2 according to another embodiment of the invention (the second embodiment of the invention).

FIG. 3 is a view showing the configuration of the vehicular information display device 2 according to another embodiment of the invention (the second embodiment of the invention).

The second embodiment of the invention shown in FIG. 3 is different from the first embodiment of the invention described above with reference to FIG. 1 mainly in the arrangement pattern of a second combiner 420. Other components that may remain unchanged will be denoted by the same reference symbols respectively and illustrated, and the description thereof will be omitted as appropriate.

As is the case with the aforementioned first embodiment of the invention, the second combiner 420 is provided apart from the surface of the front windshield 20 (the surface thereof on the vehicle interior side). As shown in FIG. 3, the second combiner 420 is arranged on the vehicle interior side with respect to the surface of the front windshield 20. The spacing distance of the second combiner 420 from the surface of the front windshield 20 is significantly larger than the board thickness of the front windshield 20. As is the case with the first combiner 40, the second combiner 420 may be any type of combiner. For example, the second combiner 420 is a holographic combiner employing a hologram. The second combiner 420 may be supported with respect to the instrument panel 10 in such a manner that a lower end of the second combiner 420 is supported by a support leg that extends upward from the instrument panel 10.

In the present embodiment of the invention, as described above, the two combiners, namely, the first combiner 40 and the second combiner 420 are employed to generate an indication. The first combiner 40 and the second combiner 420 are arranged such that a virtual image C1 according to the first combiner 40 and a virtual image C2 according to the second combiner 420 are superimposed on each other to generate a three-dimensional indication C (see FIG. 3). The arrangement pattern of the first combiner 40 and the second combiner 420 that can generate the three-dimensional indication C with the virtual image C1 according to the first combiner 40 and the virtual image C2 according to the second combiner 420 superimposed on each other is determined in accordance with the position of the floodlight 30, the projection range and projection direction of display light, the position of the observer P (the position of his/her eye) and the like. In the example shown in the drawing, the second combiner 420 is arranged substantially parallel to the first combiner 40. It should be noted herein that the expression "substantially parallel" takes into account that the second combiner 420 or the first combiner 40 may not be a plane. Besides, according to the connotation of this expression, even when the first combiner 40 and the second combiner 420 are considered to be approximate planes, they may be parallel to each other or form a very small angle (e.g., equal to or smaller than 10 degrees). Besides, the second combiner 420 may have a relationship of being offset from the first combiner 40 backward with respect to the vehicle by a predetermined distance. It should be noted, however, that the curvature of the second combiner 420 can be freely determined regardless of the curvature of the front windshield 20 (the curvature of the first combiner 40).

The three-dimensional indication C means an indication with a feeling of physical depth with the two virtual images C1 and C2 superimposed on each other as viewed from the observer P and with a distance L between the two virtual images C1 and C2 in a depth direction. Accordingly, the three-dimensional indication C is different from a stereoscopic image that requires the wearing of deflecting glasses or a stereoscopic image that utilizes a parallax barrier adopted in a naked-eye stereoscopic display.

In the present embodiment of the invention, as shown in FIG. 3, the virtual image C2 according to the second combiner 420 is generated closer to the observer (the driver side) than the virtual image C1 according to the first combiner 40 by the predetermined distance L. That is, the virtual image C2 is generated closer to the observer than the virtual image C1 by the predetermined distance L. Thus, the three-dimensional indication C (an indication with a feeling of depth) can be generated as a whole. Incidentally, the three-dimensional indication C may transmit any kind of information. However, for example, in the case of an indication for transmitting information on the position of a host vehicle as navigation information, the virtual image C1 according to the first combiner 40 may form a road indication, and the virtual image B2 according to the second combiner 420 may form a vehicle indication (e.g., a spherical indication) that is moved in accordance with the position of the host vehicle on the road indication.

Incidentally, in an example shown in FIG. 3, the floodlight 30 includes the first floodlight portion 31 that generates a part of display light reaching the first combiner 40, and the second floodlight portion 32 that generates a part of display light reaching the second combiner 420. The first floodlight portion 31 and the second floodlight portion 32 are integrated with each other to form a single floodlight portion (a projection surface). In this case, the floodlight 30 is substantially a single unit, and therefore has very good mountability. It should be noted, however, that the first floodlight portion 31 and the second floodlight portion 32 may be arranged at positions that are physically spaced apart from each other. That is, the floodlight 30 may be formed by two floodlights. In this case, the first floodlight portion 31 and the second floodlight portion 32 may have projection surfaces that are parallel to each other (i.e., may be arranged offset from each other in the projection direction of light).

Besides, in the example shown in FIG. 3, the three-dimensional indication C is generated through the superimposition of the virtual image C2 according to the second combiner 420 on the entirety of the virtual image C1 according to the first combiner 40. However, a three-dimensional indication may also be generated in such a manner that the entirety of the virtual image C2 according to the second combiner 420 is superimposed on a part of the virtual image C1 according to the first combiner 40, in such a manner that a part of the virtual image C2 according to the second combiner 420 is superimposed on a part or the entirety of the virtual image C1 according to the first combiner 40, etc. Besides, in the case of the manner in which the entirety of the virtual image C2 according to the second combiner 420 is superimposed on a part of the virtual image C1 according to the first combiner 40, the position where they are superimposed on each other may be any region of the virtual image C1 according to the first combiner 40. For example, the entirety of the virtual image C2 according to the second combiner 420 may be superimposed on a central portion of the virtual image C1 according to the first combiner 40, or may be superimposed on an end portion of the virtual image C1 according to the first combiner 40.

Figure 4:
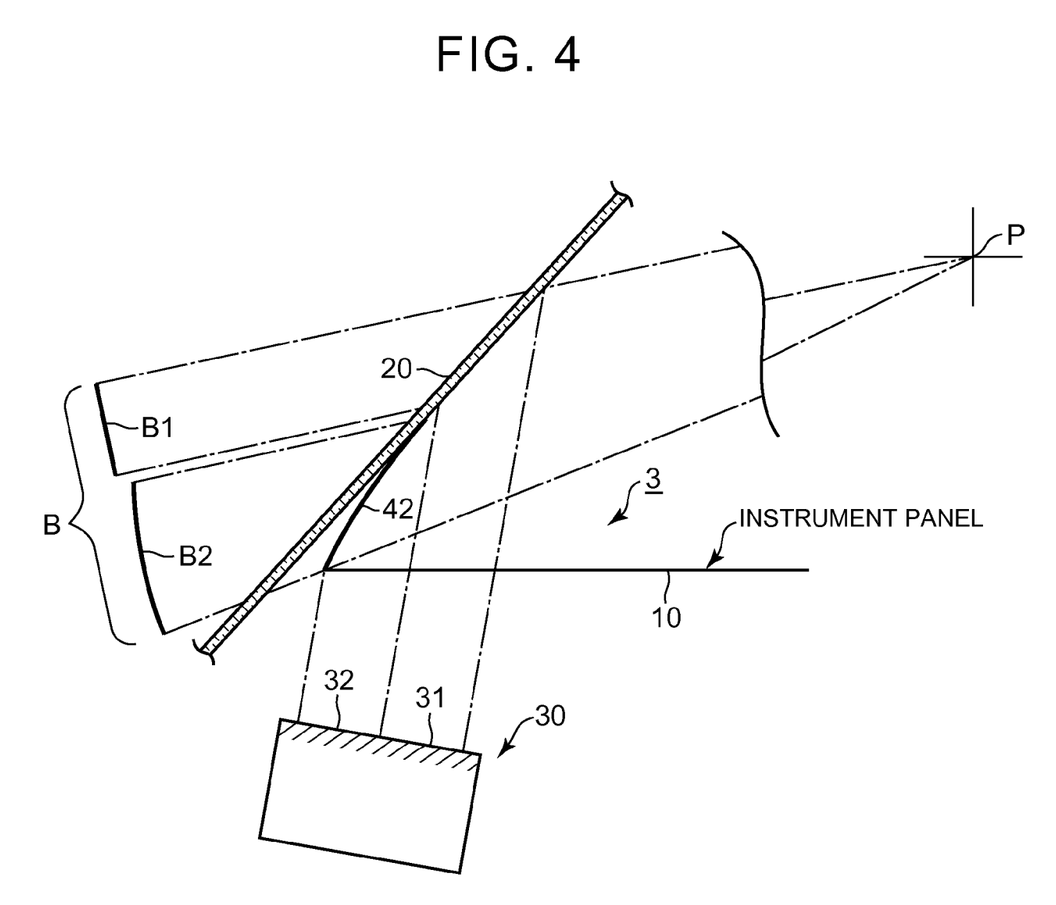
FIG. 4 is a view showing the configuration of a vehicular information display device 3 according to still another embodiment of the invention (the third embodiment of the invention).

FIG. 4 is a view showing the configuration of a vehicular information display device 3 according to still another embodiment of the invention (the third embodiment of the invention). The vehicular information display device 3 according to the present embodiment of the invention is different from the vehicular information display device 1 according to the aforementioned first embodiment of the invention mainly in that the first combiner 40 is dispensed with. Other components may be identical to those of the vehicular information display device 1 according to the aforementioned first embodiment of the invention, and are denoted by the same reference symbols respectively, and the description thereof will be omitted.

In this third embodiment of the invention, the display light projected from the floodlight 30 reaches the front windshield 20 and the second combiner 42. The display light is diffracted toward the observer P (mainly the driver) by the front windshield 20 and the second combiner 42, and an indication (a virtual image) is generated in front of the observer P. In this third embodiment of the invention, in contrast to the aforementioned first embodiment of the invention, the front windshield 20 itself, instead of the first combiner 40, functions as a reflection portion that diffracts (reflects) the display light projected from the floodlight 30 toward the observer P (mainly the driver).

This third embodiment of the invention also makes it possible to generate the integral indication B with an increased display range, and to obtain an effect similar to that of the aforementioned first embodiment of the invention.

Incidentally, in this third embodiment of the invention, the front windshield 20 may preferably have interlayers with different thicknesses (interlayers that are encapsulated among the glass layers of a multi-layered glass) in order to prevent a double image (an image that is doubly visible as a result of reflection on respective surfaces, namely, the front and rear surfaces of the front windshield 20). For example, the interlayers may gradually decrease in thickness (with a wedge-like cross-section) in a downward direction from an upper side of the front windshield 20.

Figure 5:
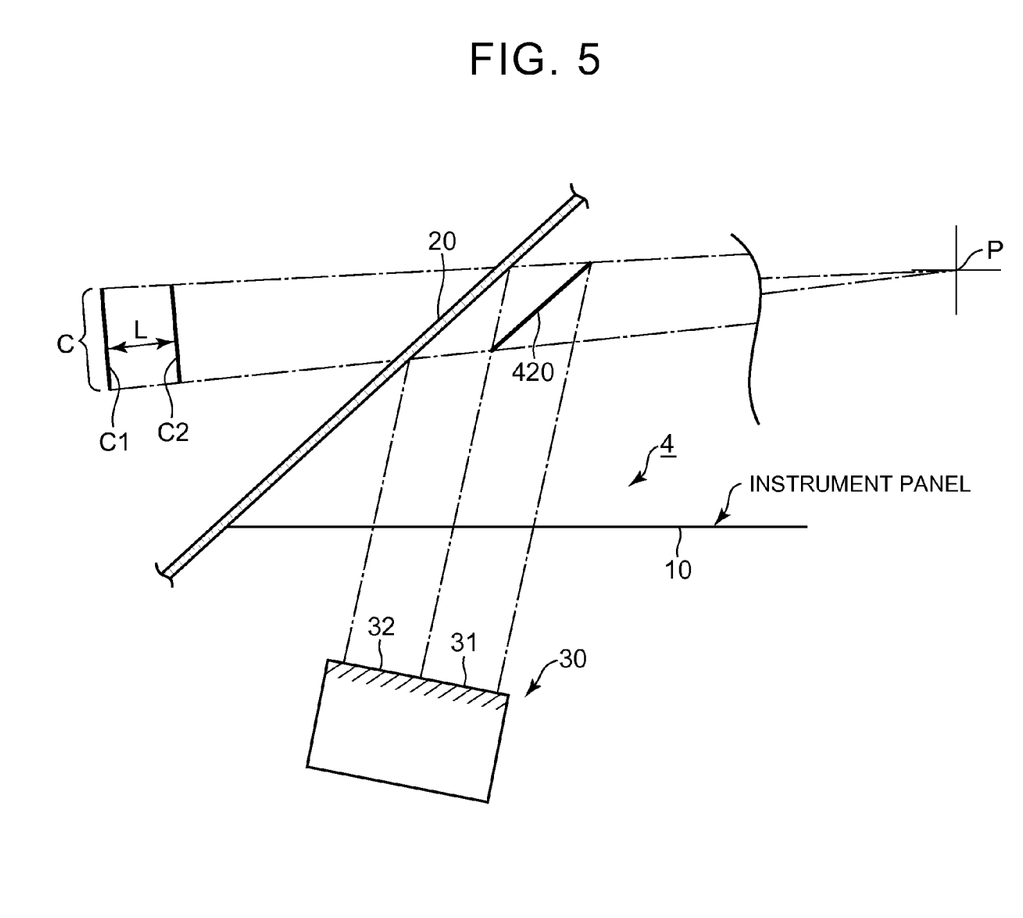
FIG. 5 is a view showing the configuration of a vehicular information display device 4 according to still another embodiment of the invention (the fourth embodiment of the invention).

FIG. 5 is a view showing the configuration of a vehicular information display device 4 according to still another embodiment of the invention (the fourth embodiment of the invention). The vehicular information display device 4 according to the present embodiment of the invention is different from the vehicular information display device 2 according to the aforementioned second embodiment of the invention mainly in that the first combiner 40 is dispensed with. Other components may be identical to those of the vehicular information display device 2 according to the aforementioned second embodiment of the invention, and are denoted by the same reference symbols respectively, and the description thereof will be omitted. Incidentally, in this fourth embodiment of the invention as well as the aforementioned third embodiment of the invention, the front windshield 20 may preferably have interlayers with different thicknesses in order to prevent a double image.

In this fourth embodiment of the invention as well as the aforementioned third embodiment of the invention, the display light projected from the floodlight 30 reaches the front windshield 20 and the second combiner 420. The display light is diffracted toward the observer P (mainly the driver) by the front windshield 20 and the second combiner 420, and an indication (a virtual image) is generated in front of the observer P. In this fourth embodiment of the invention, in contrast to the aforementioned second embodiment of the invention, the front windshield 20 itself, instead of the first combiner 40, functions as a reflection portion that diffracts (reflects) the display light projected from the floodlight 30 toward the observer P (mainly the driver).

In the present embodiment of the invention, as described above, the front windshield 20 and the second combiner 420 are used to generate an indication, but the front windshield 20 and the second combiner 420 generate the three-dimensional indication C (see FIG. 5) with the virtual image C1 according to the front windshield 20 and the virtual image C2 according to the second combiner 420 superimposed on each other. The relative arrangement pattern of the front windshield 20 and the second combiner 420 (especially the position of the second combiner 420 with respect to the front windshield 20) that can generate the three-dimensional indication C with the virtual image C1 according to the front windshield 20 and the virtual image C2 according to the second combiner 420 superimposed on each other is determined in accordance with the position of the floodlight 30, the projection range and projection direction of display light, the position of the observer P (the position of his/her eye) and the like. In the example shown in the drawing, the second combiner 420 is arranged substantially parallel to the front windshield 20. It should be noted herein that the expression ""substantially" parallel" takes into account that the second combiner 420 or the front windshield 20 may not be a plane. Besides, according to the connotation of this expression, even when the front windshield 20 and the second combiner 420 are considered to be approximate planes, they may be parallel to each other or form a very small angle (e.g., equal to or smaller than 10 degrees). Besides, the second combiner 420 may have a relationship of being offset from the front windshield 20 backward with respect to the vehicle by a predetermined distance. It should be noted, however, that the curvature of the second combiner 420 can be freely determined regardless of the curvature of the front windshield 20.

This fourth embodiment of the invention also makes it possible to generate the three-dimensional indication C identical to that of the aforementioned second embodiment of the invention, and to obtain an effect similar to that of the aforementioned second embodiment of the invention.

While the preferred embodiments of the invention have been described above in detail, the invention is not limited to the aforementioned embodiments thereof. The aforementioned embodiments of the invention can be subjected to various modifications and substitutions without departing from the scope of the invention.

For example, in the aforementioned first or second embodiment of the invention, the display light from the floodlight 30 directly reaches the first combiner 40 and the second combiner 42 (or 420, the same will hold true hereinafter). However, any optical system such as a mirror or the like may be arranged between the floodlight 30 on the one hand and the first combiner 40 and the second combiner 42 on the other hand. This holds true for the aforementioned third and fourth embodiments of the invention as well.

Besides, in the aforementioned first or second embodiment of the invention, the first combiner 40 and the second combiner 42 (or 420, the same will hold true hereinafter) are employed to generate an indication. However, in addition to the first combiner 40 and the second combiner 42, a third combiner may be employed to generate an indication. In this case, the third combiner may be configured in the same manner as the second combiner 42, may be configured in the same manner as the first combiner 40, or may be configured in other manners. This holds true for the aforementioned third and fourth embodiments of the invention as well.

Besides, in each of the aforementioned embodiments of the invention, the floodlight 30 is incorporated in the instrument panel 10. However, the floodlight 30 may be provided at other locations (e.g., in the vicinity of a room mirror).

Besides, in the aforementioned first embodiment of the invention, the second combiner 42 is provided adjacently below the first combiner 40. However, the second combiner 42 may be provided adjacently above the first combiner 40, or may be provided adjacently beside the first combiner 40.

DESCRIPTION OF REFERENCE NUMERALS 1,2 VEHICULAR INFORMATION DISPLAY DEVICE
10 INSTRUMENT PANEL
20 FRONT WINDSHIELD
30 FLOODLIGHT
31 FIRST FLOODLIGHT PORTION
32 SECOND FLOODLIGHT PORTION
40 FIRST COMBINER
42, 420 SECOND COMBINER

The invention claimed is:

1. A vehicular information display device comprising:
a first reflection portion including a front windshield itself or a first combiner that is provided on the front windshield;
a second reflection portion including a second combiner that is provided spaced apart from the front windshield, wherein a spacing distance between the second combiner and a surface of the front windshield is larger than a thickness of the front windshield; and
a floodlight that projects display light onto the first reflection portion and the second reflection portion, wherein
the first reflection portion and the second reflection portion generate a three-dimensional indication with a virtual image according to the first reflection portion and a virtual image according to the second reflection portion superimposed on each other, or an integral indication with a virtual image according to the first reflection portion and a virtual image according to the second reflection portion integrated with each other.

2. The vehicular information display device according to claim 1, wherein
the first reflection portion and the second reflection portion generate the three-dimensional indication with the virtual image according to the first reflection portion and the virtual image according to the second reflection portion superimposed on each other, and
the second reflection portion extends substantially parallel to the first reflection portion behind the first reflection portion with respect to a vehicle.

3. The vehicular information display device according to claim 2, wherein
the floodlight is configured as a single floodlight that is common to the first reflection portion and the second reflection portion.

4. The vehicular information display device according to claim 1, wherein
the first reflection portion and the second reflection portion generate the integral indication with the virtual image according to the first reflection portion and the virtual image according to the second reflection portion integrated with each other,
the second reflection portion has a center of curvature on a vehicle interior side,
a curvature of the second reflection portion is larger than a curvature of the first reflection portion, and
the floodlight is configured as a single floodlight that is common to the first reflection portion and the second reflection portion.

* * * * *